(12) United States Patent
Anwar

(10) Patent No.: US 7,576,730 B2
(45) Date of Patent: Aug. 18, 2009

(54) USER INTERFACE SYSTEMS AND METHODS FOR VIEWING AND MANIPULATING DIGITAL DOCUMENTS

(75) Inventor: Majid Anwar, Glasgow (GB)

(73) Assignee: Picsel (Research) Limited, Glasgow (GB)

(*) Notice: Subject to any disclaimer, the term of this patent is extended or adjusted under 35 U.S.C. 154(b) by 831 days.

(21) Appl. No.: 10/813,285

(22) Filed: Mar. 29, 2004

(65) Prior Publication Data

US 2004/0194014 A1    Sep. 30, 2004

Related U.S. Application Data

(62) Division of application No. 09/835,458, filed on Apr. 16, 2001.

(30) Foreign Application Priority Data

Apr. 14, 2000  (GB) ................... 0009129.8

(51) Int. Cl.
*G06F 3/041* (2006.01)
(52) U.S. Cl. .................... 345/173; 345/156
(58) Field of Classification Search ......... 345/156–184; 178/18.01, 18.03, 19.01, 20.01
See application file for complete search history.

(56) References Cited

U.S. PATENT DOCUMENTS

| | | |
|---|---|---|
| 4,839,634 A | 6/1989 | More et al. |
| 5,083,262 A | 1/1992 | Haff |
| 5,278,678 A | 1/1994 | Harrington |
| 5,327,161 A | 7/1994 | Logan et al. |
| 5,369,735 A | 11/1994 | Thier et al. |

(Continued)

FOREIGN PATENT DOCUMENTS

EP          0 438 194 A          7/1991

(Continued)

OTHER PUBLICATIONS

Blumberg, et al., "Visual Realism and Interactivity for the Internet," Proceedings of IEEE Compcon, 1997, San Jose, Feb. 23-26, 1997 Los Alamitos, IEEE Comp. Soc. Press, Feb. 1997, pp. 269-273.

(Continued)

*Primary Examiner*—Ricardo L Osorio
(74) *Attorney, Agent, or Firm*—Ropes & Gray LLP

(57) ABSTRACT

Systems, including handheld computing devices that include system code stored within the memory and adapted to be executed by the processor. The system code can process an input byte stream that is representative of contents to be displayed on the touch sensitive display and can generate a content document file representative of an internal representation of the content. A tool document file may also be stored in the memory and may provide an internal representation of a document providing an image that is representative of a graphical tool. Associated with a tool document can be tool code that is capable of processing the content document file to create an internal representation of the contents that presents the content in a manner that achieves a display effect associated with the tool. The device will also include parsing code that processes the content document file, the tool document file, and the processed internal representation to generate a screen document for display on the touch sensitive display in a manner that portrays the display effect.

30 Claims, 11 Drawing Sheets

U.S. PATENT DOCUMENTS

| | | | |
|---|---|---|---|
| 5,390,320 | A | 2/1995 | Smithline |
| 5,463,725 | A | 10/1995 | Henckel et al. |
| 5,530,865 | A * | 6/1996 | Owens et al. ............... 719/313 |
| 5,534,975 | A | 7/1996 | Stefik et al. |
| 5,754,348 | A * | 5/1998 | Soohoo ....................... 359/802 |
| 5,810,680 | A | 9/1998 | Lobb et al. |
| 5,867,166 | A | 2/1999 | Schick et al. |
| 5,899,988 | A | 5/1999 | Depledge et al. |
| 5,909,207 | A | 6/1999 | Ho |
| 5,910,805 | A | 6/1999 | Haschart et al. |
| 5,911,066 | A | 6/1999 | Atkinson et al. |
| 6,034,700 | A | 3/2000 | Nickell et al. |
| 6,097,371 | A * | 8/2000 | Siddiqui et al. ............. 345/164 |
| 6,125,391 | A | 9/2000 | Meltzer et al. |
| 6,310,610 | B1 | 10/2001 | Beaton et al. |
| 6,335,722 | B1 * | 1/2002 | Tani et al. ................... 345/173 |
| 6,336,124 | B1 | 1/2002 | Alam et al. |
| 6,411,274 | B2 | 6/2002 | Watanabe et al. |
| 6,525,749 | B1 | 2/2003 | Moran et al. |
| 6,717,573 | B1 | 4/2004 | Shahoian et al. |
| 2008/0027933 | A1 * | 1/2008 | Hussam ........................ 707/6 |

FOREIGN PATENT DOCUMENTS

| | | |
|---|---|---|
| EP | 0 465 250 | 1/1992 |
| EP | 0 479 496 A | 4/1992 |
| EP | 0 513 584 A | 11/1992 |
| EP | 529 121 A | 3/1993 |
| EP | 0 753 832 A | 1/1997 |
| EP | 0 764 918 A | 3/1997 |
| EP | 0 860 769 A | 8/1998 |
| EP | 0 949 571 A2 | 10/1999 |
| EP | 0 980 045 | 2/2000 |
| GB | 2 313 277 A | 11/1997 |
| WO | WO-97/34240 | 9/1997 |
| WO | WO-97/36225 | 10/1997 |
| WO | WO-98/10356 | 3/1998 |
| WO | WO-98 37506 A | 8/1998 |
| WO | WO-99 10840 A | 3/1999 |
| WO | WO-00 10372 A | 3/2000 |

OTHER PUBLICATIONS

Rowe, J.H., "Metafiles and Computer Graphics," Computers and Graphics, Pergamon Press, Ltd. Oxford, Great Britain, vol. 10 No. 2, 1986, pp. 103-106.

Office Action dated Jan. 23, 2008 U.S. Appl. No. 10/853,495.

* cited by examiner

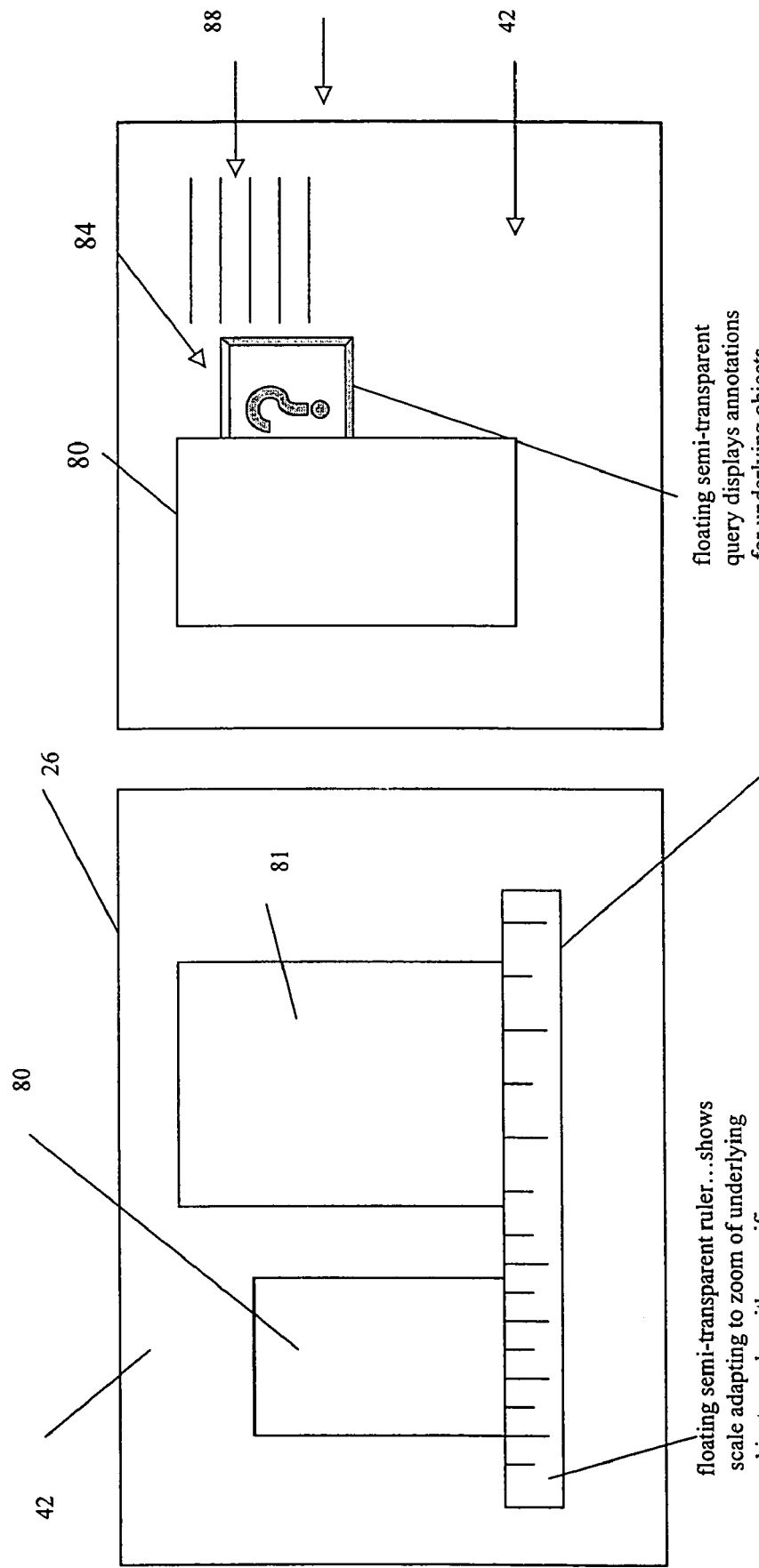

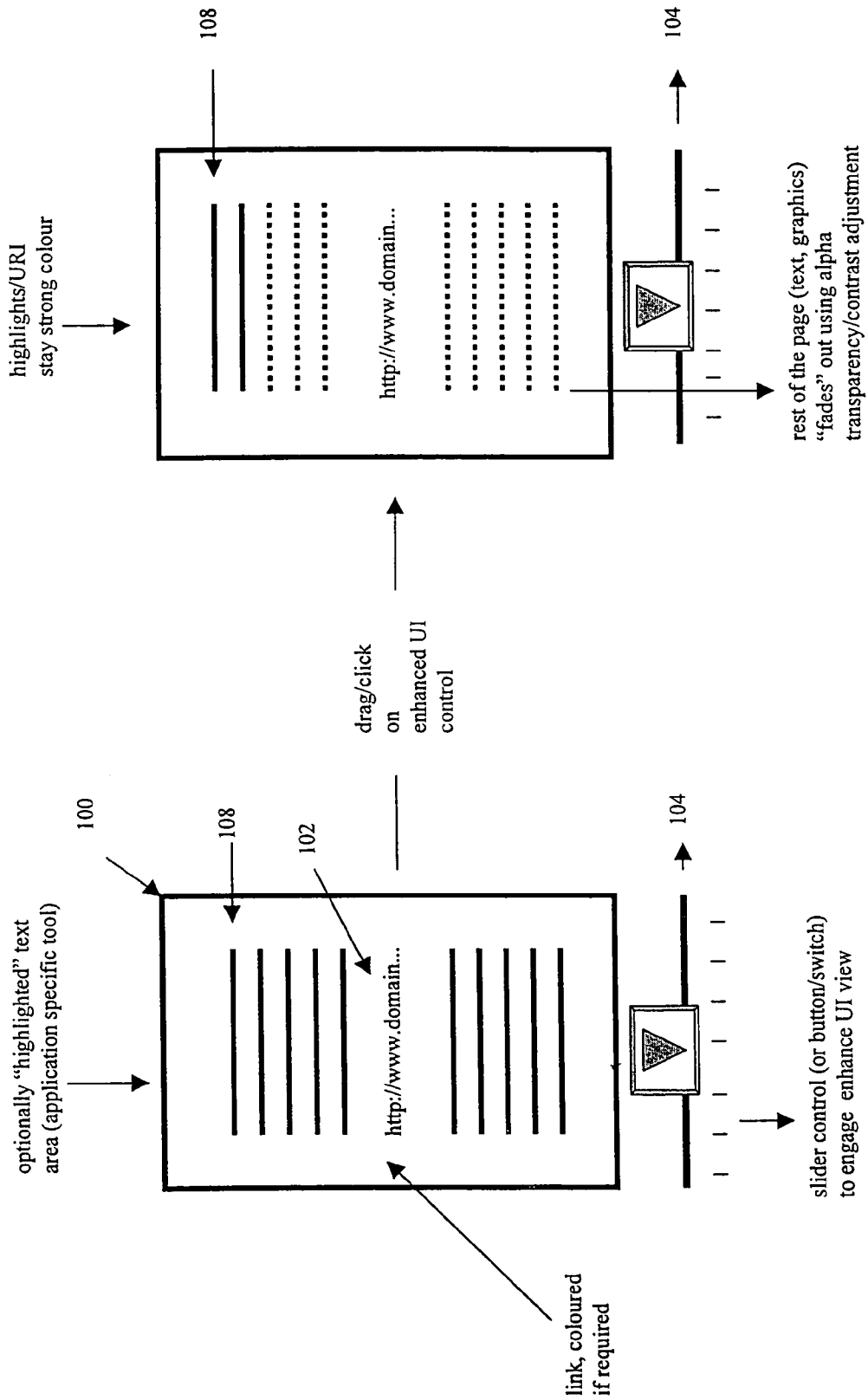

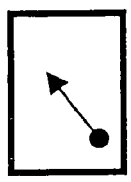# = wipe or no
Figure 12D
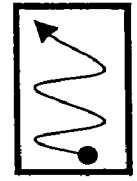
Figure 12E
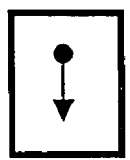 = next
Figure 12F
= previous
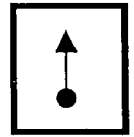
Figure 12G
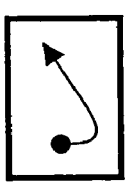 = OK
Figure 12A
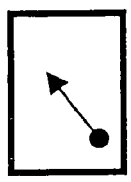 = Delete
Figure 12B
= home page or start over
Figure 12C

USER INTERFACE SYSTEMS AND METHODS FOR VIEWING AND MANIPULATING DIGITAL DOCUMENTS

REFERENCE TO RELATED APPLICATIONS

This application is a divisional of, and claims priority to, U.S. patent application Ser. No. 09/834,458, filed on Apr. 16, 2001. The systems and methods described herein relate to earlier filed British patent application No. 0009129.8 and earlier filed U.S. patent application Ser. No. 09/703,502, as well as the U.S. patent application Ser. No. 09/835,679, filed on Apr. 16, 2001, all of which name Majid Anwar as an inventor, and the contents of which are herein incorporated by reference.

FIELD OF THE INVENTION

The systems and methods described herein relate to systems and methods for viewing and manipulating a display of digital documents, and more particularly to user interface systems and methods that allow a user to manipulate and view a digital document presented on a display, such as the display of a hand held electronic device, such as a computer, mobile communicator or phone; or a display device associated with a tactile commander.

BACKGROUND OF THE INVENTION

Today, there is a strong effort to build mobile and handheld computing devices that easily allow users to view documents, email, video presentations, and other forms of content. To achieve this convergence, engineers and scientists have developed systems including the systems described in the above-referenced U.S. patent application entitled, Systems and Methods for Processing Digital Documents, the contents of which are hereby incorporated by reference. As described therein, digital content, whether a document, audio visual presentation, or some other type of content, is processed by a software system operating on a handheld device, mobile device, or some other platform, and translated into a uniform internal representation that can be processed and manipulated by the software system so that a display of different types of content can be generated by the system and presented on the screen display of the respective device.

These systems, as well as other handheld and mobile computing systems such as the Palm Pilot, Compaq Ipaq, and mobile phones, are therefore capable of providing a display of content to a user. However, these handheld and mobile systems are typically limited to simple input devices such as small and limited keyboards, commonly the keyboards present on a cellular phone, or by small touch screen systems, such as the touch screens provided with the Palm computing device. Therefore, although these systems are capable of presenting content to a user wherein the content can be quite complex, these systems have limited capacity to allow a user to manipulate the display of that content, such as by paging through the different pages of a document or selecting different portions of a document. Therefore, although these handheld and portable systems may be quite useful, there are limitations to their use based in part on the user interfaces available for supporting the manipulation and viewing of the content presented on these devices.

Consequently, there is a need in the art for systems and methods that provide improved user interface tools that make it more facile to manipulate and view content presented by a handheld or portable device.

Additionally, there is a need in the art for user interface tools that allow for the manipulation of content, when that content is separated from its native application program.

SUMMARY OF THE INVENTION

The systems and methods described herein provide advanced user interface tools that allow a user to more easily manipulate and view content presented on a mobile device or handheld device. In one particular embodiment, the systems and methods described herein provide a graphical user interface that exhibits a touch and feel user interface experience. More specifically, the systems and methods described herein include hand-held or mobile computer devices having a system for simulating tactile control over a document which may be viewed on the device itself or through a remote instruction or remote instruction or remote display on another unit. These systems may include a housing which supports a processor, memory, and a touch-sensitive display (or display with remote touch-sensitive control), system code stored within the memory and adapted to be executed by the processor. The system code may generate or provide a digital representation of a document, wherein the digital representation may include data content and a page structure representative of the page layout of the document. Thus, in certain applications the rendered image can include the content of the document as well as the layout of the document, thereby providing an image of what the document physically looks like. The system may also include a rendering engine that may include a parser and a renderer for rendering at least a portion of the page layout of the digital representation on the touch-sensitive display. A screen monitor can monitor the touch-sensitive screen for detecting movement across a surface of the touch sensitive screen, and an interface process can process the detected movement to detect a motion representative of a command to alter the page structure of the digital representation. A navigation module may be responsive to the interface process and can change the rendered portion of the page layout. Thus, by altering the rendered portion of the page layout, the system allows a user to navigate through the digital representation of the document. Although the systems and methods of the invention will have applicability and value when used in other applications and on other types of systems, for purposes of illustration, the invention will be described with reference to those applications where the systems facilitate the navigation of documents presented on a hand-held computing device.

More particularly, the systems and methods described herein provide, among other things, computer devices having a system for simulating tactile control over a document. In one embodiment, these systems comprise a processor, memory, and a display; system code stored within the memory and adapted to be executed by the processor, the system code providing a digital representation of a document including data content and a page structure representative of a page layout of the document; a rendering engine for rendering at least a portion of the page layout of the digital representation on the display; a screen monitor for monitoring the screen to detect movement of an object across an image presented on the display; an interface process for processing the detected movement to detect a motion representative of a command to alter the rendered page structure of the digital representation, and a navigation module responsive to the interface process for changing the rendered portion of the page layout, wherein altering the rendered portion of the page layout allows a user to navigate through the digital representation of the document.

These computer devices can include touch-sensitive displays where the screen monitor monitors a touch-sensitive screen for detecting movement across a surface of the touch sensitive display, as well as computer displays capable of depicting a cursor moving across a screen of the display, and wherein the screen monitor detects movement of the cursor across a surface of the display. The processor, memory, screen monitor and a display may be arranged as a data processing platform useful with a plurality of applications and devices including hand-held computers, telephones, mobile data terminal, a set top box, an embedded processor, a notebook computer, a computer workstation, a printer, a copier and a facsimile machine.

In certain optional embodiments, the computer device may also include a velocity detector for determining a velocity vector associated with motion detected across the surface of the touch-sensitive display, as well as means for applying a velocity characteristic to a document within a display.

Additionally, these computer devices can have an interface processes that make it more easy to navigate through a document or a collection of documents and other content. These interface processes can include a page-flip detector for detecting a motion across the surface of the touch-screen at a location presenting a portion of the page layout graphically representative of a corner of a document. The page-flip detector can render a portion of the page layout representative of a page adjacent a currently rendered page. Similarly, the device can include a page curl detector for rendering a portion of the page layout representative of a portion of a page adjacent a currently rendered page. Additionally, the interface process can include a gesturing process for detecting a predefined movement representative of a command for selecting a portion of the page layout to be rendered, or for altering data content of the digital representation of the document. Still further interface controls include processes for controlling a transparency characteristic of a document presented on the display and for controlling a transparency characteristic of selected portions of the document for adjusting visibility of the selected portions relative to other portions of the document. Other interface processes can provide tools, including tools representative of a magnifying tool, a ruler, a text entry cursor, a thumbnail navigation column, a thumbnail view of linked content and a query tool.

In still other aspects, the invention provides computer devices, and related processes, having a context sensitive graphical interface tool. These devices may comprise a processor, memory, and a touch-sensitive display; a content document file stored in the memory and being representative of an internal representation of the content; a tool document file stored in the memory and providing an internal representation of a document providing an image that is representative of the graphical interface tool; tool code capable of running of the processor and being associated with the tool document file and capable of processing the content document file to create an internal representation of the content that when rendered presents the content in a manner that achieves a display effect associated with the tool; parsing code that processes the content document file, the tool document file, and the processed internal representation to generate a screen document for display, and; interface code capable of running on the processor for allowing a user to arrange the image of the graphical interface tool into a selected contextual relationship over the rendered content and for directing the tool code to process a portion of the content document file associated with the selected position.

The contextual relationship between the graphical interface tool and the rendered content can vary depending upon the application, and may for example be selected from the group consisting of the relative position of the graphical interface tool and the rendered content, the time at which the graphical interface tool acts on the rendered content, and the state of the rendered content. These devices are flexible and may be embodied in different forms and devices, including, but not being limited to, a hand-held computer, a telephone, mobile data terminals, a set top box, an embedded processor, a notebook computer, a computer workstation, a printer, a copier, and a facsimile machines, as well as in car systems, and domestic devices such as audio players, microwaves, refrigerators, and washing machines.

However, it will be understood by those of ordinary skill in the art that these interface tools may be employed in other applications including applications wherein content is displayed on a conventional computer workstation that includes typical input tools such as a standard keyboard and a mouse. Additionally, it will be understood that the systems and methods described herein also provide useful tools for providing interfaces for embedded display systems, such as embedded visual displays employed as output devices. Examples of such embedded display systems can include cellular phones, copy machines that include a visual touch screen display that allows a user to select different options for performing a copy job and which may also present images to the user of the documents being copied. Other examples may include fax machines wherein visual displays are provided to a user to allow a user to view a depiction of an incoming fax. Other embodiments and applications of the user interface systems and methods described herein will be apparent to those of ordinary skill in the art.

More particularly, the systems and methods described herein provide user interface tools that allow a user to manipulate content displayed on a screen. In particular, the systems and methods described herein provide software systems that create an abstraction layer for information that is to be presented on a display. This abstraction layer includes a document object wherein a document object contains information, or content, that is to be displayed on a screen. In one implementation, all information displayed on a screen is treated as one document. Thus, at the highest level, the entire contents of a screen is understood as one document object. Further to this embodiment, it will be understood that a document object may contain other document objects, each of which may contain a subset of the content displayed to the user. Thus, at the screen level, all information displayed will be understood as a single document wherein items, such as web pages, streamed video, and graphical icons, presented on the screen are each understood separately as document objects contained within the high level screen document object. Therefore, all content displayed on a screen is treated abstractly as a document, and this paradigm holds whether the content being displayed is information representative of a page of text or information representative of a user interface tool or window/desktop furniture. Accordingly, the user interface systems and methods described herein provide user interface tools and functionality for allowing a user to manipulate document objects presented on a screen display.

Additionally, the systems and methods described herein provide, in one embodiment, a handheld computing device that comprises a housing which supports a processor, memory, and a touch sensitive display. Further, the computing device may include system code stored within the memory and adapted to be executed by the processor. The system code can process an input byte stream that is representative of content to be displayed on the touch sensitive display and can generate a content document file representative of an internal representation of the content. A tool document file may also be stored in the memory and may provide an internal representation of a document providing an image that is representative of a graphical tool. Associated with a tool document can be tool code that is capable of processing the content document file to create an internal representation of the content that presents the content in a manner that achieves a display effect associated with the tool. The device may also include parsing code that processes the content document file, the tool document file, and the processed internal representation to generate a screen document for display on the touch sensitive display in a manner that portrays the display effect.

BRIEF DESCRIPTION OF THE DRAWINGS

The foregoing and other objects and advantages of the invention will be appreciated more fully from the following further description thereof, with reference to the accompanying drawings wherein;

FIG. 5 depicts a semi-transparent and adaptively sizeable ruler graphical tool;

FIG. 6 depicts a transparent query marker graphical user interface tool;

FIGS. 8a and 8b depict a user interface tool for visually enhancing selected portions of a displayed document;

FIGS. 12a-12g depict a set of strokes for providing commands to a hand-held system.

DETAILED DESCRIPTION OF THE ILLUSTRATED EMBODIMENTS

The systems and methods described herein include systems and methods for manipulating and viewing documents displayed on a viewing surface such as a computer terminal, a display screen, a printer, plotter, or any other output device suitable for creating a visual representation of human readable information. For the purpose of illustration, the systems and methods will be described with reference to certain exemplary embodiments, including hand held computer systems that include touch screen displays and which are capable of displaying an integrated view of content produced in different formats. In particular, the systems and methods described herein include graphical user interface tools that are capable of presenting tools that can be presented as content that will be integrated along with other content being displayed on the screen.

Figure 1:
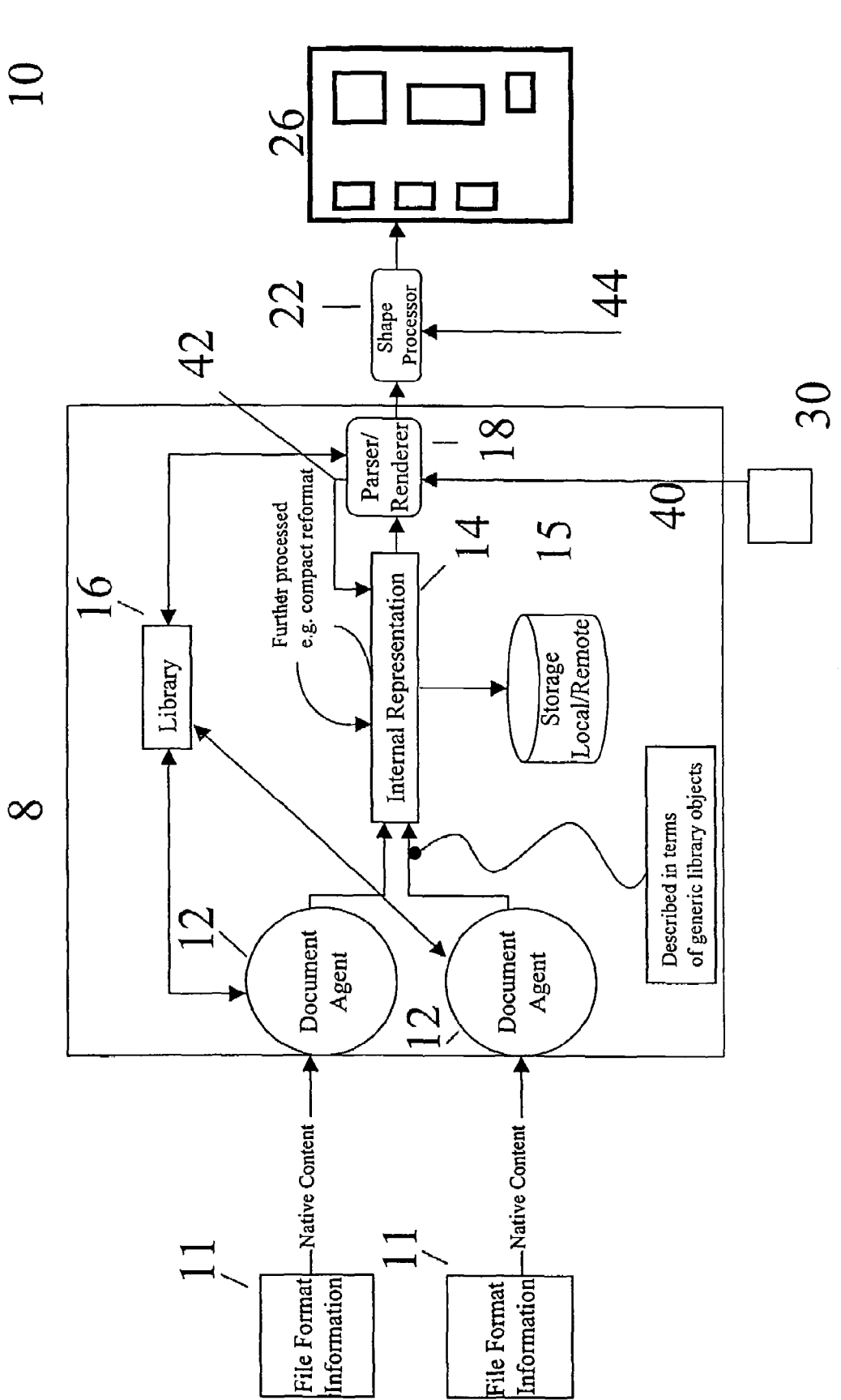
FIG. 1 provides a functional block diagram of one system according to the invention.

FIG. 1 depicts a system 10 according to the invention. The system 10 is shown as a functional block diagram of a computer device of the type that commonly includes a processor, a memory and a display. However, the system 10 may also be realized, in whole or in part as a software system comprising system code capable of executing on a processor to configure the processor as a system according to the invention. The depicted system 10 includes a computer process 8, a plurality of source documents 11, a tool document file 30, a shape processor 22 and a video display 26. The computer process 8 includes a plurality of document agents 12, a library of generic data objects 16, an internal representation file 14, a memory buffer or file 15, and a parser/renderer engine 18.

In the depicted embodiment, the display 26 can present the images of a plurality of different documents. Each of the representative outputs appearing on display 26 is termed a document, and each of the depicted documents can be associated with one separate application program, such as Word, Netscape Navigator, Real Player, Adobe, Visio and other types of applications. It will be understood that the term document as used herein will encompass documents, streamed video, web pages, and any other form of data that can be processed and displayed by the computer process 8.

The computer process 8 generates a single output display that includes within that display one or more of the documents. The collection of displayed documents represent the content generated by the application programs and this content is displayed within the program window generated by the computer process 8. The program window for the computer process 8 may also include a set of icons representative of tools provided with the graphical user interface and capable of allowing a user to control the operation, in this case the display, of the documents appearing in the program window.

For the illustrated embodiment, the display 26 presents content representative of different data types in a single, integrated display. This is in contrast to the conventional approach of having each application program form its own display, which results in a presentation on the display device 26 that includes several program windows, typically one for each application program. Additionally, each different type of program window would include a different set of user interface tools for manipulating the content displayed in that window. Thus, the system depicted in FIG. 1 creates an integrated display that contains viewable images of documents of different types. This includes web pages that would normally be viewed in a browser, word documents that would normally be viewed in a viewer or word processing document, PDF documents that would normally be viewed in a vector graphic reader, and streaming video that would normally be viewed in a video player. Thus, the depicted system 10 separates the content of these documents from the underlying application program and presents them for display on the screen 26.

To allow a user to manipulate the depicted documents, the system 10 depicted in FIG. 1 provides a set of tools that can be used to navigate through a collection of documents, whether it is a multi-page text document, the pages of a web site or a series of time varying images that make up a video presentation. To this end, as will be explained in greater detail below, the system 10 creates documents that are representative of tools and which may be displayed by the system 10 just as system 10 would display any other type of document. Thus the system 10 of the invention has the advantage of providing a consistent user interface, and only requiring knowledge of one set of tools for displaying and controlling the different documents.

As discussed above, each source document 11 is associated with a document agent 12 that is capable of translating the incoming document into an internal representation of the content of that source document 11. To identify the appropriate document agent 12 to process a source document 11, the system 10 of FIG. 1 includes an application dispatcher (not shown) that controls the interface between application programs and the system 10. In one practice, an external application programming interface (API) communicates with the application dispatcher which passes data, calls the appropriate document agent 12, or otherwise carries out a request made by an application program. To select the appropriate document agent 12 for a particular source document 11, the application dispatcher advertises the source document 11 to all the loaded document agents 12. These document agents 12 then respond with information regarding their particular suitability for translating the content of the published source document 11. Once the document agents 12 have responded, the application dispatcher selects a document agent 12 and passes a pointer, such as a URI of the source document 11, to the selected document agent 12.

As shown in FIG. 1, the document agent 12 employs the library 16 of standard object types to generate the internal representation 14, which describes the content of the source document 11 in terms of a collection of document objects as defined in the library 16, together with parameters defining the properties of specific instances of the various document objects within the document. The document object types employed in the internal representation 14 will typically include: text, bitmap graphics and vector graphics which may or may not be animated and which may be two- or three-dimensional: video, audio and a variety of types of interactive objects such as buttons and icons. Vector graphics document objects may be PostScript-like paths with specified fill and transparency. Text document objects may declare a region of stylized text.

Once documents are translated into an internal representation of document objects; these objects are passed to the parser/renderer 18. The parser/renderer 18 generates a context-specific representation or "view" of the documents represented by the internal representation 14. The required view may be of all the documents, a whole document or of parts of one or some of the documents. The parser/renderer 18 receives view control inputs which define the viewing context and any related temporal parameters of the specific document view which is to be generated. For example, the system 10 may be required to generate a zoomed view of part of a document, and then to pan or scroll the zoomed view to display adjacent portions of the document. The view control inputs are interpreted by the parser/renderer 18 to determine which parts of the internal representation are required for a particular view and how, when and for how long the view is to be displayed.

The context-specific representation/view is expressed in terms of primitive figures and parameters. Optionally, there may be a feedback path 42 between the parser/renderer 18 and the internal representation 14, e.g. for the purpose of triggering an update of the content of the internal representation 14, such as in the case where the source document 11 represented by the internal representation 14 comprises a time varying multi-frame animation.

Each source document 11 provides a digital representation of a document, such as a text document, a spread sheet or some other document. The document agent 12 creates an internal representation of that document. In one practice the created digital representation includes information that describes the page layout of the document, including information about page size, margins and other page layout information. The digital representation also includes information about the content of the source document, such as the text, figures, and other content information that appears in the document. Processes for translating a known file structure into another structure are known in the art, including systems that identify page structure and content information. Any of the suitable techniques for performing this operation may be practiced without departing from the scope of the invention.

The output from the parser/renderer 18 expresses the document in terms of primitive figures. For each document object, the representation from the parser/renderer 18 defines the object at least in terms of a physical, rectangular boundary box, the actual shape of the object bounded by the boundary box, the data content of the object, and its transparency. The shape processor 22 interprets the primitive object and converts it into an output frame format appropriate to the target output device 26; e.g. a dot-map for a printer, vector instruction set for a plotter, or bitmap for a display device. An output control input 44 connects to the shape processor 22 and can deliver user interface control signals to generate an output suitable for a particular output device 26. Thus, the parser/renderer 18 and the shape processor 22 can act as an engine that renders portions of the page layout and page content on the display 26.

Additionally, FIG. 1 depicts a tool document file 30. The tool document file 30 may be a computer data file that stores information representative of an image, wherein that image may represent a tool such as a magnifying glass, a cursor, a ruler, or any other type of tool. For the purpose of illustration, the system 10 depicted in FIG. 1 will now be described with reference to an example wherein the tool document file 30 includes data that is representative of a graphical image of a magnifying glass. The magnifying glass image will be associated with a function that allows a user to magnify the image of a document stored on the display 26 by passing the magnifying glass over the respective image. As will be described in greater detail hereafter, the magnifying glass can include a central lens portion wherein portions of a document that fall under the lens of the magnifying glass appear to the user to be magnified and therefore are presented in an enlarged format relative to the rest of the underlying document. Although the below example will be described primarily with reference to the magnifying glass tool, it will be obvious to those of ordinary skill in the art that other types of tools may be provided using the systems and methods described herein and all such tools will be understood to fall within the scope of the invention.

Figure 2:
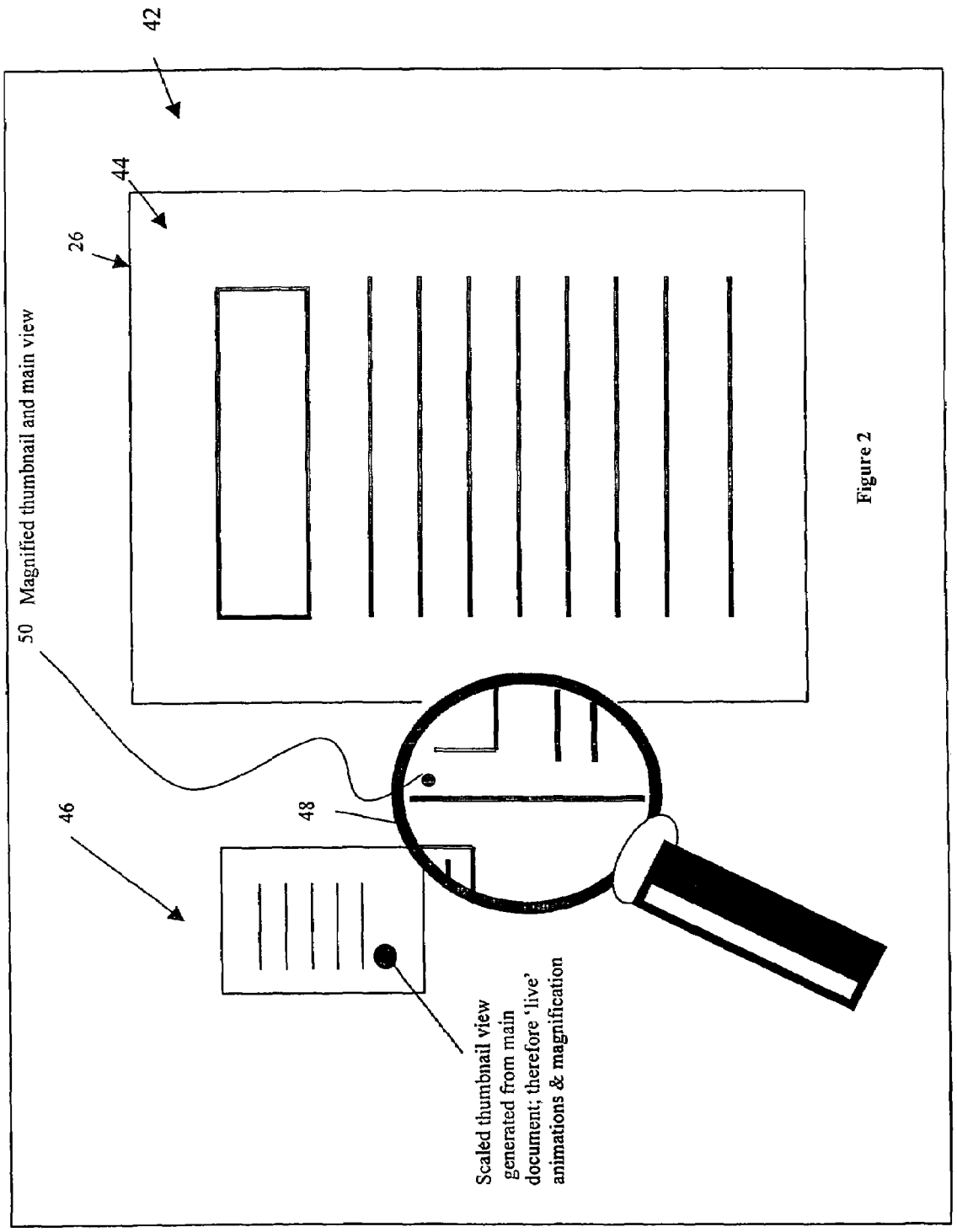
FIG. 2 depicts one example of a tool generated by a system such as the system depicted in FIG. 1.

Turning to FIG. 2, the operation of the magnifying glass tool can be seen. Specifically, FIG. 2 depicts the display 26 wherein the display 26 presents a screen document 42 that comprises a plurality of sub elements including the document 44, the thumbnail document 46, the magnifying glass document 48, and the lens document 50. The display 26 presents the screen 42 as a single integrated document that contains sub documents 44 through 50. The content provided for creating the screen 42 can come from one or a plurality of source documents 11 whose content appears as the document 44 and thumbnail document 46. The screen document 42 also comprises content provided by the tool document file 30 that, in this example, contains data according to an internal representation data format wherein that data represents the image of the magnifying glass 48. Additionally, the tool document file 30 may contain a portal object that creates a further document by processing the appropriate portion of the screen document 42 to present that content in an enlarged format to appear as the magnified document 50 appearing within the lens of the magnifying glass 48. Thus, the document appearing within the lens 50 is derived from the underlying document, and therefore this derived document changes according to the context in which the magnifying glass tool 48 is employed. Accordingly, the specific behavior for the tool can vary depending on the context of its use. For example, a magnifying glass tool may be associated with tool code that processes differently the content of a content document having map data than a content document having text. For example, with a map, the magnifying glass tool may process the associated content document to render handles within the associated document structure that are tagged as only to be shown within a view created by a magnifying glass. Thus the derived document presented within the magnifying glass tool 48 can include additional information, such as street names, tourist sites, public transportation locations, notations or other information. In this operation, the magnifying glass tool responds to the context of the application, which is the rendering of a view of a map. In other applications, where the magnifying glass tool is employed on text, the behavior of the tool may result in changes to the color or style of the text, or could result in the presentation of text editing tools and user interface controls, such as control buttons, pull down menus, annotation information, text bubbles, or other types of information.

Accordingly, the screen document 42 is an integration and aggregation of information contained within a source document 11 and a tool document file 30. An application program associated with the tool document file 30 can process the appropriate content to create the enlarged view 50. The magnifying tool 48 and the associated source code are capable of identifying that portion of the screen document 42 that is to be presented in an enlarged format to create the enlarged view 50. The tool code is further capable of processing the selected content to create the enlarged view 50 and clip that enlarged view within the lens area of the magnifying glass 48 to achieve the display affect of an enlarged region of the screen 26. Thus, the tool document and the source document 11 are in the same internal representation, and thus can be merged into the screen document 42, that can be rendered by the parser/renderer 18.

In one embodiment, the graphical tool 50 may be moved over the screen by dragging with a cursor, or if a touch-sensitive screen is present, by dragging a stylus or some other pointer across the screen of the display. To process this movement, the display 26 may include a screen monitoring process for monitoring the screen of the display 26 to detect movement of a cursor, stylus or some other pointer across the images of the documents presented on the screen. Such screen monitoring processes are known in the art and any suitable process may be employed. The monitor process, therefore allows a user sense of tactile control over the visual representation of the document 44. The movements detected by the screen monitor process may be passed to an interface process that processes the detected motion to detect a motion representative of a known command. The interface process may be a separate process or may be part of the screen monitor process, as is common in the art. As the interface module detects commands to move the tool 50, a navigation module can create input signals that direct the parser/render 18 to create a new display for presentation to the user, where in the display will show the tool 50 repositioned as the user wanted.

Figure 3:
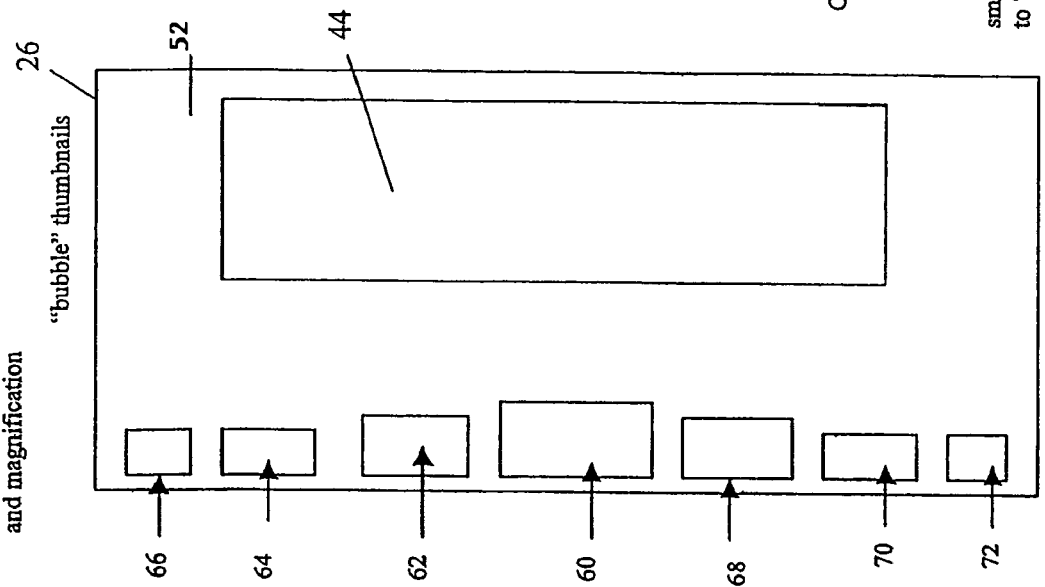
FIG. 3 depicts a graphical user interface tool that presents a plurality of thumbnail sketches for navigating through a document having a plurality of pages.

Accordingly, the system depicted in FIG. 1 is capable of providing a graphical user interface tool that may be integrated into a screen display that represents a single document which contains a plurality of sub documents, some of which sub documents include the graphical tools themselves. The power of this approach allows for the development of novel graphical user interface tools that allow a user to manipulate and view a document on a display and to simulate tactile control over the depicted documents. These systems and methods are particularly well suited to use on hand held and mobile computing platforms where traditional input tools are lacking. Additional graphical user interface tools that may be provided by the systems and methods described herein include the bubble thumbnail graphical tool depicted in FIG. 3. Specifically, FIG. 3 depicts the screen display 26 that includes a screen document 52 which comprises a plurality of sub documents including the document 44 and the thumbnail documents 60 through 72. As shown in FIG. 3, the document 44 may be presented as a large document employing most of the viewing area of the display 26. In this embodiment, the thumbnail documents 60 through 72 are arranged in a vertical column within the screen document 52 at a position adjacent the left side of the display 26. The thumbnail documents 60 through 72 vary in size with the largest thumbnail document 60 being centrally positioned within the vertical array of thumbnail documents.

As further shown by FIG. 3 as documents in the vertical array increase in distance from the center document 60, the documents decrease in size. The measure of distance from the center document may be representative of the distance in pages from the document 44, or may be representative of some other measure of distance or difference, such as the amount of time that has passed since the document was last viewed, the difference in alphabetical order, or some other characteristic. Thus documents 62 and 68, which are adjacent the central document 60 are somewhat smaller than the document 60. Further documents 64 and 70 which are adjacent documents 62 and 68 respectively and further from document 60 are smaller than documents 64 and 68 still. The decrease in size of documents continues from documents 66 and 72, each of which is still smaller. The impression created by the array of thumbnail documents 60 through 72 is employed to indicate that document 60, the largest document, is representative of the document 44 being displayed within the largest viewing area of the screen document 52. Documents 62 through 72 get smaller in proportion to the "distance" from the current viewing page 60. Accordingly, the vertical column of thumbnail document 60 through 72 provide a navigation tool that a user can employ for selecting a document to appear within the large viewing area of the display 26. Additionally, the user can select a document within the vertical array of thumbnails to choose a new document to appear within the viewing area. For example, in those applications where the screen display 26 is a touch sensitive screen display, the user may activate a new document to appear within the viewing area by touching the respective thumbnail document within the array of documents 60 through 72. In those applications where the user is provided a keyboard, or a mouse, the user may employ that particular input device for selecting which of the documents within the array of documents that the user would like to appear within the viewing area. In an optional embodiment, the user can scroll through the thumbnails to find the document of interest. Optionally, scrolling through the thumbnail documents can result in the document 44 changing with the scrolling of the document. Alternatively, the scrolling of the thumbnail documents can occur independently from any changing of the document 44, with the document 44 only changing when a new thumbnail document is selected.

Accordingly, as the systems and processes described herein may employ thumbnail images for queuing a user during navigation to generate thumbnail images, the systems and processes described herein can include any suitable thumbnail generator processes including those known in the art, including those thumbnail generations that generate live, or animated thumbnails.

Figure 4:
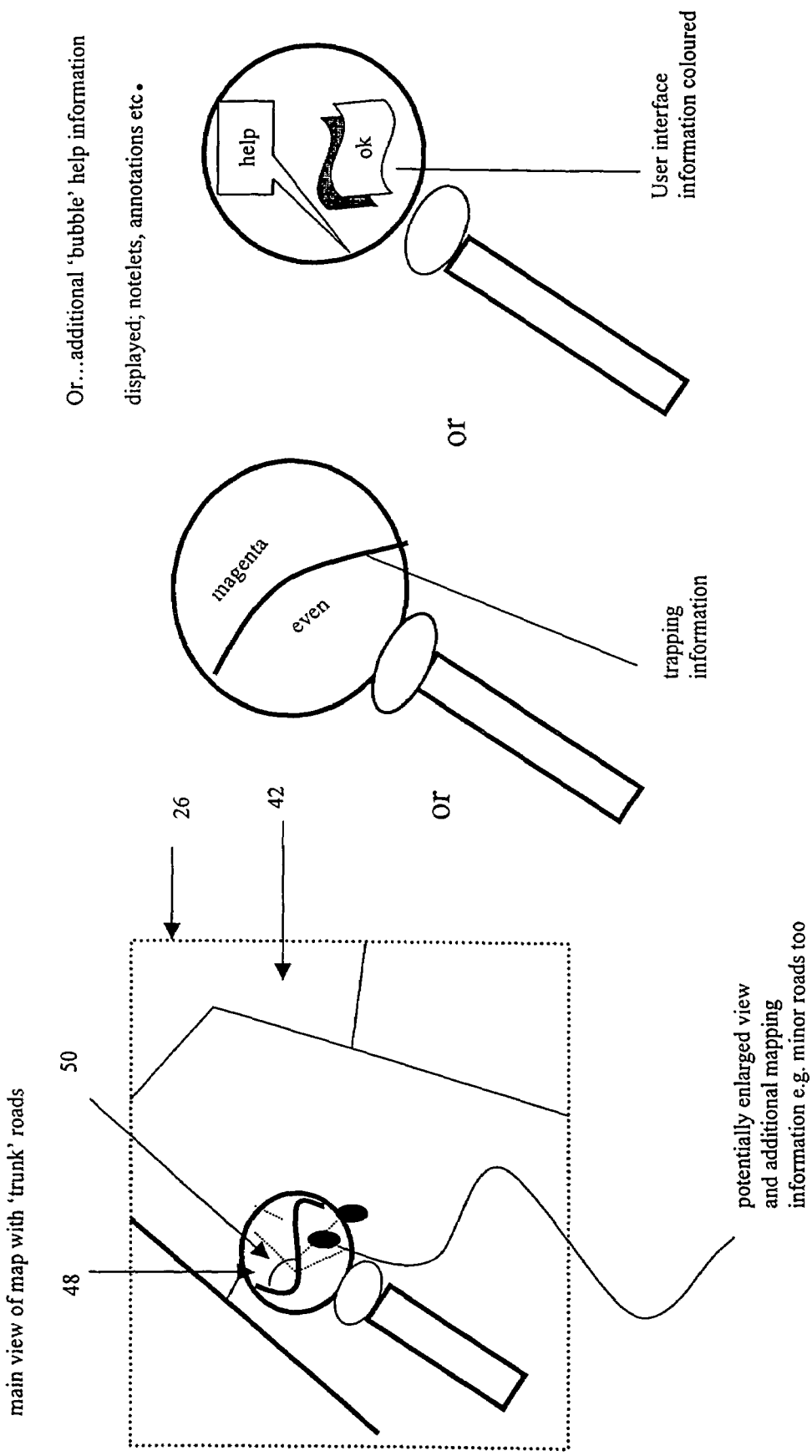
FIG. 4 depicts a magnifying graphical user interface tool according to the invention which provides additional information within a magnified area.

FIG. 4 depicts a further embodiment of the systems and methods described herein wherein the magnifying tool, earlier shown in FIG. 2 is associated with tool code that results in information not earlier presented in a document to appear within the lens area of the magnifying glass object. More specifically, FIG. 4 depicts a display 26 that includes a screen document 42, which in this view appears as a map. FIG. 4 further depicts the magnifying glass tool 48 that includes the lens area 50. As shown in FIG. 4 the magnifying tool 48 is positioned over a portion of the map 42. As described above, the tool code associated with the magnifying glass 48 is capable of presenting an enlarged view of the relevant portion of the screen document 42. As additionally shown in FIG. 4 the magnified portion 50 also includes additional information. For example, in the mapping application depicted in FIG. 4, the enlarged view 50 may include additional mapping information such as minor roads, locations of interest, or other information relevant to the content being magnified. Additionally however, the magnifying glass may be associated with tool code that changes that color of the information, or a portion of the information, within the viewing area 50, or presents user interface information such as control buttons, pull down menus, annotation information, text bubbles, or other types of information. Accordingly, the specific behavior for the tool can vary depending the context of its use. For example, as described above the magnifying glass tool may be associated with tool code that processes differently the content of a content document having map data than a content document having text. Thus, the systems described herein provide context sensitive tools and processes.

FIGS. 5 and 6 depict further embodiments of graphical user interface tools that may be provided by the systems and methods described herein. In particular FIG. 5 depicts a screen 26 that includes a screen document 42 that comprises two documents 80 and 81, and a ruler 82. The two documents 80 and 81 are meant to represent similar types of documents, each being text documents printed on the same size paper, such as A4 paper. However, as the scale of the presentation of document 81 is larger than the scale of presentation for document 80, FIG. 5 depicts the two documents 80 and 81 as pages of text, wherein one page is larger than the other. Thus, documents 80 and 81 are similar documents that have been rendered with different scaling factors. As depicted in FIG. 5 the ruler 82 may be a floating semi-transparent ruler that shows the scale of each document and which can adapt to the scale of the underlying object. This is depicted by the scale of the ruler 82 increasing in size as the length of the ruler travels from document 80 to document 81. FIG. 5 portrays that the scale of the ruler 82 changes in proportion to the scale of the underlying documents. Thus, the ruler 82 provides a context sensitive user interface tool that is capable of adjusting the scale of the ruler in response to the presentation scale of the content. Turning to FIG. 6, a further user interface tool, the floating semi-transparent query mark 84 is depicted wherein the query mark 84 may display annotations for the underlying object according FIG. 6 depicts that the display 26 includes a screen document 42 the comprises a document 80 and a floating semi-transparent query tool 84. The query tool 84 when activated, either by dragging an image of the query tool onto the document, or by selecting a query tool icon already positioned over a document, will present text 88 that may include information representative of an annotation of the underlying document 80.

Figures 7A, 7B:
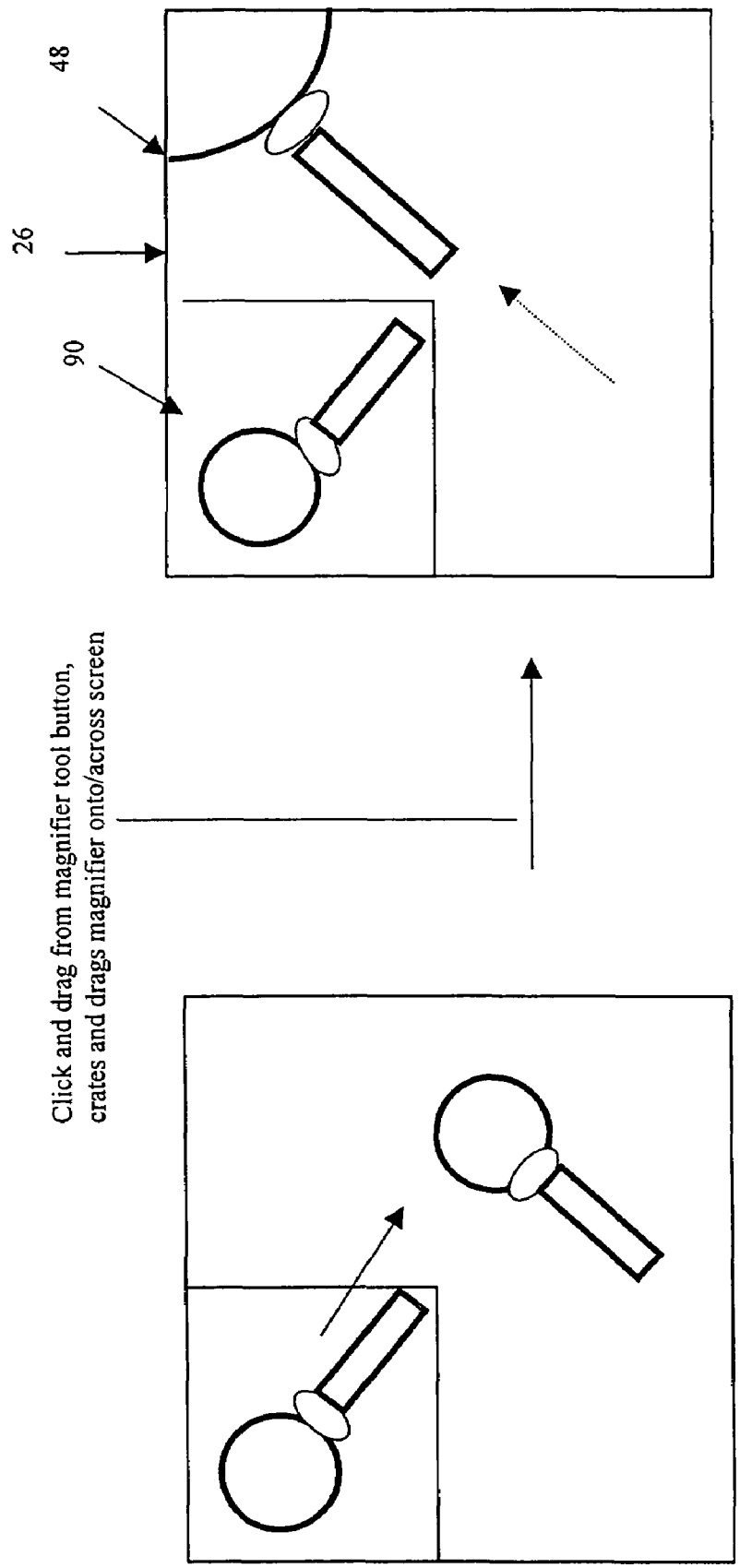
FIGS. 7a and 7b depict a user interface mechanism for activating and deactivating a graphical tool.

FIG. 7a depicts one method for presenting to a user the available user interface tool. In particular, FIG. 7a depicts a screen 26 that includes a tool button 90. The tool button 90 provides a graphical representation of the magnifying tool 48. To activate the magnifying tool 48 the user may click, either by use of a mouse, keypad or touch screen, and drag from the magnifier tool button an image of the tool 48. By clicking on the tool button 90 the system will process information from the tool document file to create the image of the document 48 shown in FIG. 7a. FIG. 7b depicts that the user interface can allow in one practice the user to push the magnifying tool 48 off the screen 26, optionally in any direction. By pushing the tool off the screen 26 the user removes the tool 48 and restores the icon, or the tool button 90 to the screen.

FIGS. 8a and 8b depict a further tool of the type that may be employed when viewing documents that include links, or other types of pointers to other documents, or other content. Specifically FIG. 8 depicts a tool wherein a document 100 includes links 102 to another document. For these documents, the systems and methods described herein may provide a slider control 104, as well as buttons, switches, or some other control. The depicted slider control 104, may enhance the user interface view of the document 100 such that by sliding the control 104, the user can control the prominence of the link 102 within the document. Thus, the tool 104 allows the user to adjust the prominence of links within a document such as the document 100 so that links may be more easily identified by the user. FIGS. 8a and 8b further depict that document 100 may include highlighted text such as the depicted highlighted text 108. As with the link 102 the slider control 104 may allow the highlighted text 108 to maintain its transparency while the transparency of the remaining portions of document 100 vary as the slider control 104 is varied by the user. In operation, the slider control 104 can allow the user to adjust the transparency, or alpha figure, of the objects that make up the document 100 other than the objects that make up the link 102 or highlighted text 108. However, other techniques for fading or enhancing portions of a document, may be practiced.

Figure 9:
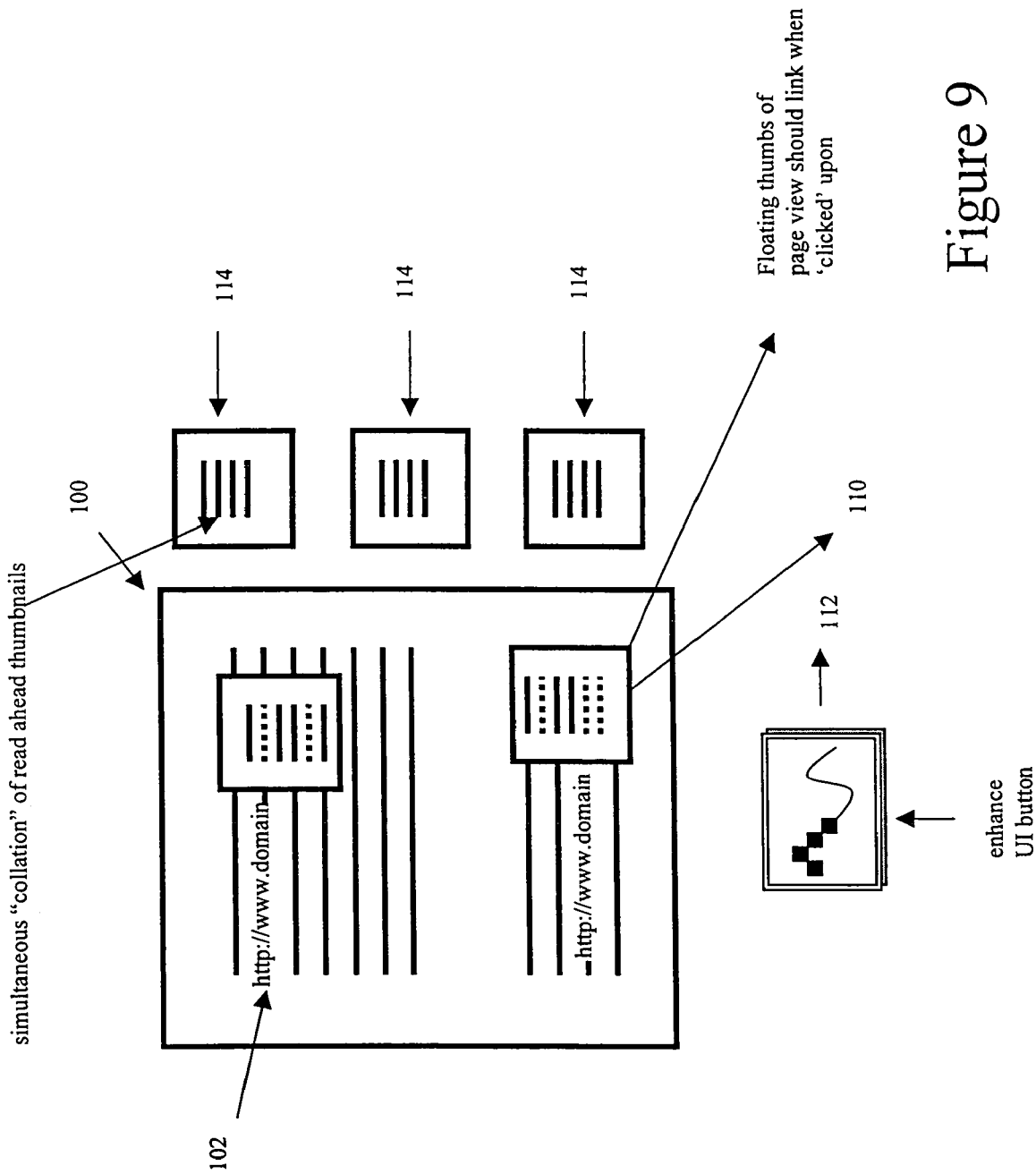
FIG. 9 depicts a further user interface tool according to the invention.

Turning to FIG. 9, a further graphical user interface tool is presented wherein a document 100 includes links 102. Moreover the links 102 may be associated with a floating thumbnail document 110. As shown in FIG. 9 a control 112 may be presented to the user. Upon activating the control 112, those links 102 within the document 100 may be associated with a floating thumbnail representative of a page view of the page associated with the respective link 102. Additionally, FIG. 9 depicts that in one option practice the display may further include a collegian of read ahead thumbnail documents 114. The thumbnail documents 114 may be representative of those documents that are associated with links 102 within document 100, or that are associated with other pages of the document 100 when that document 100 is a multipage document.

Figure 10:
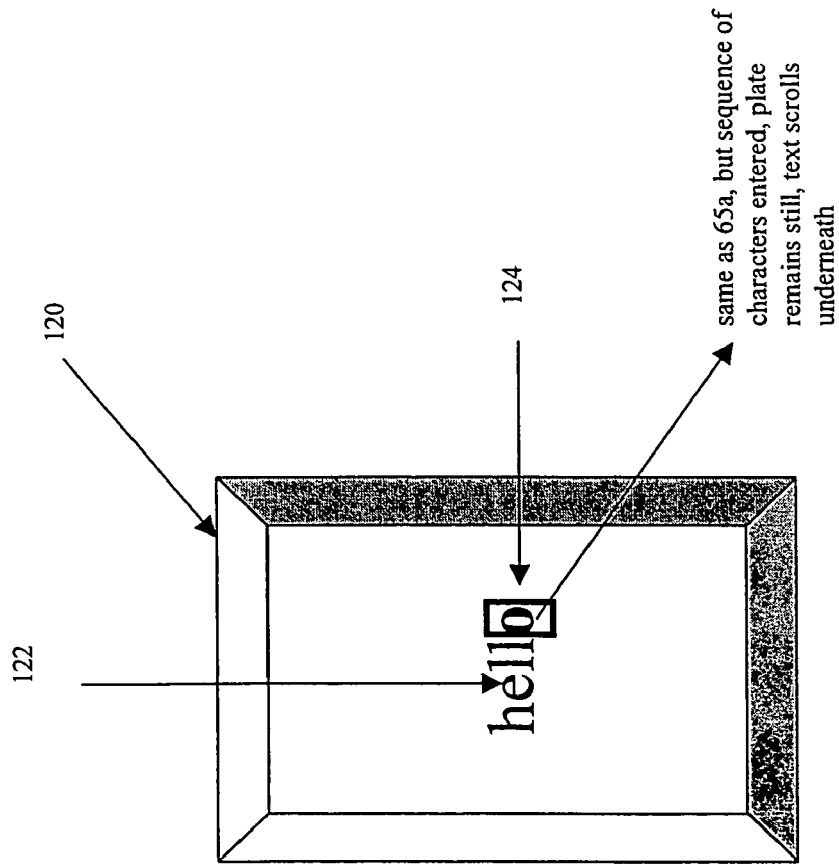

FIG. 10 depicts a further example of a graphical user interface tool according to the invention. Specifically, FIG. 10 depicts a hand held computing device 120 having a set of characters 122 appearing on its display. As further shown in FIG. 10 a cursor window 124 appears over one character within text display 122. In the depicted embodiment the cursor window 124 provides a soft, semi-transparent text entry plate floating over the current text position. The plate may move with the moving text position and/or the plate may maintain its position as the text itself scrolls to the left to accommodate movement of text under the plate 124. As discussed above, the text plate cursor 124 may result from a tool document file 30 processed by the system 10 of FIG. 1. The tool document file may include an internal representation of the text plate 124 appears on the device 120. In one embodiment, the hand held device 120 includes a touch sensitive screen that allows a user to employ a stylus for forming characters that will appear on the screen within the text entry plate 124. A design and development of such systems that allows such text entry are well known in the art and any of the suitable systems may be employed with the systems and methods described herein. In operation, a user may move a stylus across the screen of the device 120 to form letters that will appear within the text entry plate 124. This operation is depicted in FIG. 11 wherein a series of text entry procedures 130 through 138 are depicted.

Figure 11:
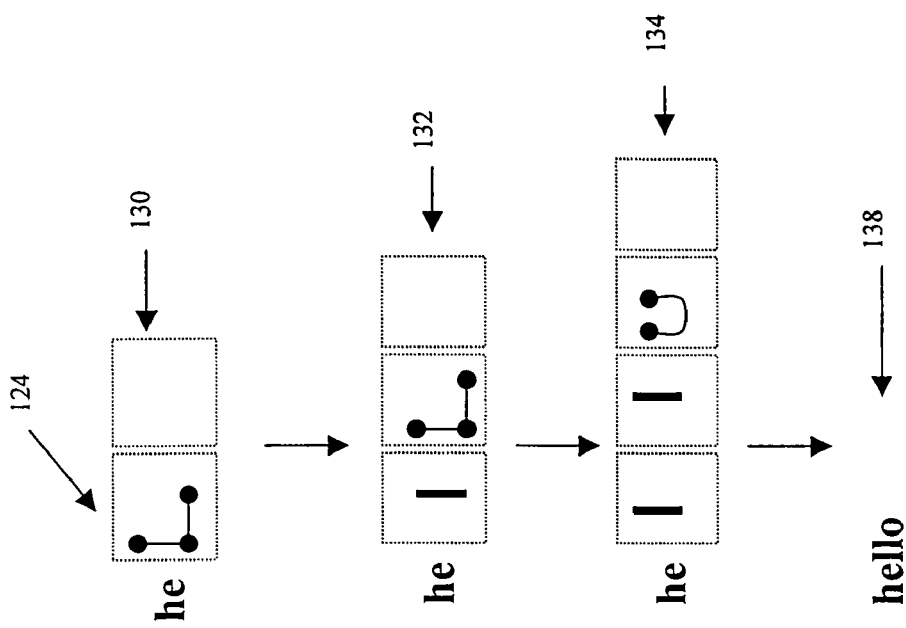
FIGS. 10 and 11 depict a text entry tool according to the invention.

Particularly, FIG. 11 depicts text entry step 130 wherein the cursor plate 124 appears on the display of the device 120. A user may trace a letter within space defined by the cursor 124, or in another area and optionally, the tracings may appear within the area defined by the text entry cursor 124. The tracings entered by the user may be processed by a character recognition system of the type known in the art to associate these markings with a character, such as the letter L in this example. As shown in step 132 once character recognition has been completed the recognized character L may be presented on the display and the cursor may move, or the text may scroll, but in either the cursor 124 becomes available for the user to enter more text. Thus as shown in step 134 the user may enter text until a word is formed. In step 138, upon entry of a complete word the user may move the cursor 124 a space away from the written word and begin again tracing characters that will appear within the text entry cursor 124. Thus, the depicted cursor 124 provides a tool that allows in-line insertion of content into a document, such as by inserting a section of text into an existing line of text that occurs within the document. In other applications, tools can be provided that edit images, such as by erasing content, changing colors or performing other applications.

As described above, for those systems that include a touch sensitive display the systems and methods described herein may provide for allowing a user to use a stylus to trace markings on the display and these marking may be interpreted by the system for allowing character entry. Additionally, FIG. 12*a* through 12*b* depicts a series of representative command strokes that a user may enter by moving stylus across the touch sensitive screen. Each of the command strokes depicted in FIG. 12*a* through 12*g* may be associated with a user interface command that the user may employ for manipulating and viewing documents. For example, 12*a* depicts a stroke wherein the user forms a rounded check mark that the system may be associated with a command that affirms an action proposed by the system. Similarly, FIG. 12*b* depicts a stroke that forms a plurality of peaks and troughs on the display and that may associated with a command to delete content from a display. FIG. 12*c* depicts a circular clock wise stroke that may be associated with having a document returned to a home page or to start over and FIG. 12*d* depicts a straight line diagonal upstroke that indicates a delete, clear, or no command. FIG. 12*e* depicts a box stroke running counter clock wise and indicating a paragraph select command and FIGS. 12*f* and 12*g* depict strokes that indicate a request by the user to move to the next or respectively previous document. It will be understood by those of ordinary skill in the art that as the systems and methods described herein include systems and methods that work with document of different types such as Word documents, web pages, streaming media, and other types of content the meaning of the different strokes may vary according to the application. For example, the circular clock wise rotation of 12*c* may indicate for a document that is representative of web page a request to return to a web page associated with the web page document. Alternatively, the use of the circular clock wise stroke of 12*c* when viewing streamed media content may indicate a request to start over, causing the streamed video to stop and restart from the beginning. Accordingly, it will be apparent to those with ordinary skill in the art that the stroke command depicted in FIGS. 12*a* through 12*b* may have different meanings depending on their applications.

Figure 13B:
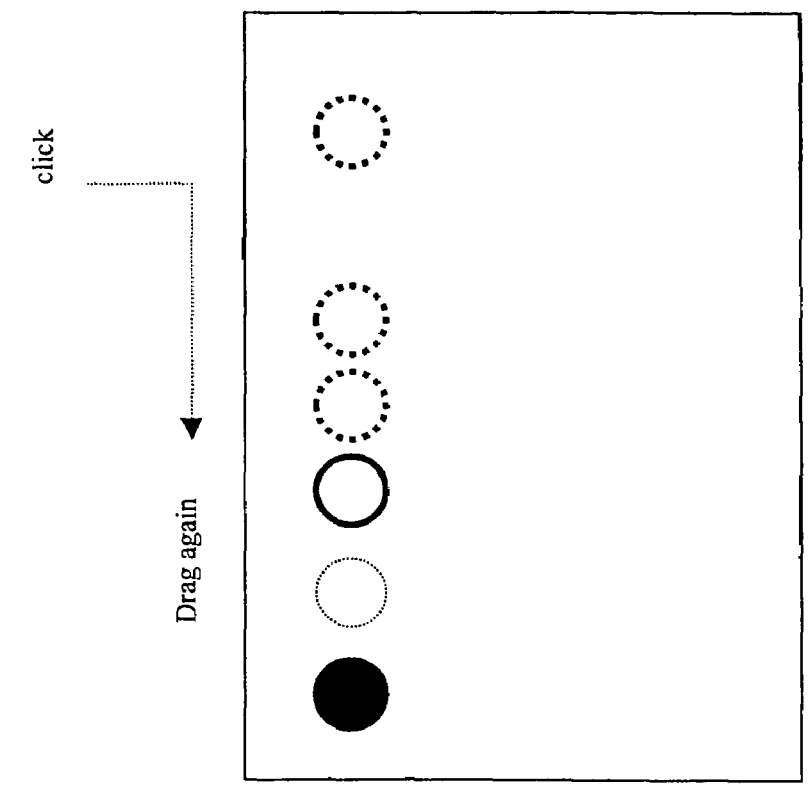
FIGS. 13A-13B depict a user interface tool for scrolling through a document by applying a velocity characteristic to the document being displayed.
Figure 13A:
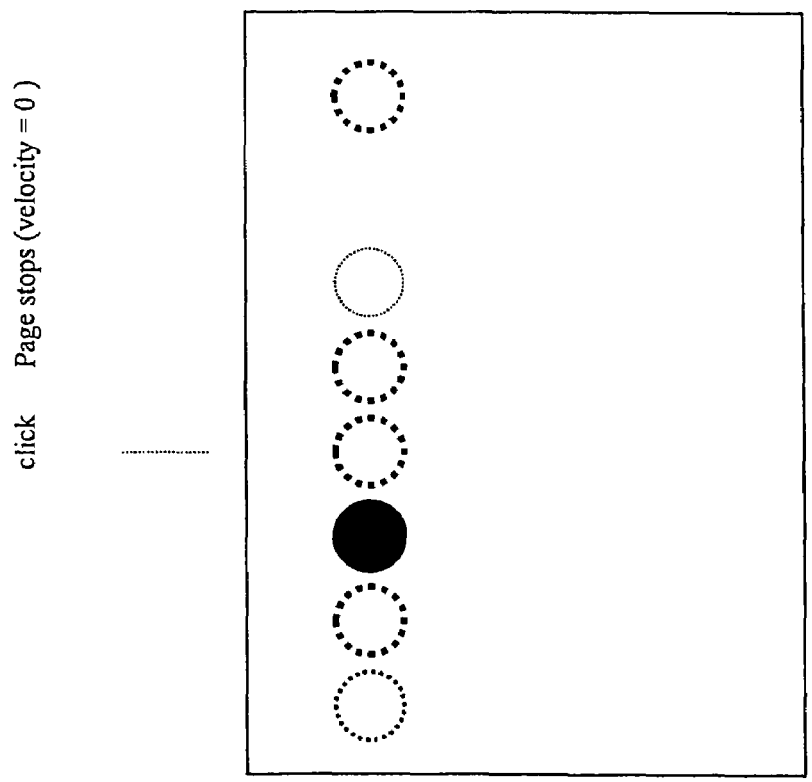

FIG. 13*a* and FIG. 13*b* depict a command stroke that may be employed by a user for clicking and dragging a document to cause page movement of that document within the viewing area. In the depicted embodiment, during a document drag operation document a velocity detector process takes position readings periodically, such as every centi-second. From these position readings a page velocity determination may be made. The page velocity determination may be employed for allowing the user interface to present a more natural way of moving documents through a viewing space. To this end, a process may employ the velocity determination to direct the parser/render 18 to redraw the document in a series of pictures that will portray the document as moving across the screen. For example, a user may drag a document at a certain speed and then release the stylus, mouse or other input device from the document. Optionally, upon release the document may stop moving. However, in an alternative practice the page may continue to move in the established direction until the user indicates that the document is to stop moving such as clicking on the document. For multi page documents the velocity measure may be used for panning different pages of the document across the screen at a rate determined by the page velocity set when the user drags one page of the document across the screen. Optionally, the velocity may decrease by a constant page inertia until it reaches zero velocity and page scrolling ceases; during page panning further velocity detection can be used to increase (accumulate) the page velocity and hence movement against the page inertia enabling smooth continuos movement of the page between rapid sequential drag operations.

Additionally and optionally, other user interface processes may be provided to enhance the user experience of having tactile control over the document. For example, the user interface may include a page-flip detector for detecting a motion on the display 26 at a location of the display associated with the upper right hand corner of document 44 in FIG. 2. If the page-flip detector, or the screen monitor, detect a brushing motion across the surface of the document 44, the page-flip detector can direct the parser/render 18 to "flip" the page, causing the next page, chapter, scene or other section to be displayed. Motions may be detected in either direction for page-flipping back and forth, and the page flip detector may be context sensitive, generating a new display suited to the application and type of content. Optionally, the interface process may include a page curl detector that can operate similar to the page-flip detector, except that a motion in the upper right corner of document 44 can cause the page curl detector to direct the parser/render 18 to redraw the screen 42 or document 44 so that the corner of the document 44 is curled downward and a portion of the underlying page is presented. Both the page-flip and page-curl detectors may be computer processes that can generate instructions to the parser/renderer 18 to achieve the desired effect. Additionally, a page-zoom detector (such as a double-click over the page area) can be followed by an upward/downward movement to zoom in/out of the view. This function may be advantageously combined with the velocity detector to provide an inertial zoom feature.

It shall be obvious to those of skill in the art that although FIG. 1 graphically depicts the user interface system 10 as functional block elements, these elements can be realized as computer programs or portions of computer programs that are capable of running on a data processor platform to thereby configure the data processor as a system according to the invention. Moreover, although FIG. 1 depicts the system 10 as an integrated unit, it will be apparent to those or ordinary skill in the art that this is only one embodiment, and that the invention can be embodied as a computer program distributed across multiple platforms.

As discussed above, the user interface systems described above can be realized as a software component operating on a data processing system, including hand-held computing platforms, as well as more conventional computing platforms, such as a Unix workstation. In these embodiments, the user interface systems can be implemented as a C language computer program, or a computer program written in any high level language including C++, Fortran, Java or BASIC. Additionally, in an embodiment where the platform is primarily a microprocessor, microcontrollers or DSPs, the user interface systems can be realized as a computer program written in microcode or written in a high level language and compiled down to microcode that can be executed on the platform employed. The development of such systems is known to those of skill in the art, and such techniques are set forth in the literature, including for example Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art.

Additionally, it is to be understood that although FIG. 1 graphically depicts the computer process 8 as comprising a plurality of functional block elements, these elements can be realized as computer programs or portions of computer programs that are capable of running on the data processing platform to thereby configure the data processing platform as a system according to the invention. Moreover, although FIG. 1 depicts the system 10 as an integrated unit of a process 8 and a display device 26, it will be apparent to those of ordinary skill in the art that this is only one embodiment, and that the systems described herein can be realized through other architectures and arrangements, including system architectures that separate the document processing functions and user interface functions of the process 8 from the document display operation performed by the display 26.

Those skilled in the art will know or be able to ascertain using no more than routine experimentation, many equivalents to the embodiments and practices described herein. Moreover, the systems and processes of the invention have wide application and can be employed in a range of devices including hand-held computers, telephones, mobile data terminals, set top boxes, an embedded processor, a notebook computer, a computer workstation, a printer, a copier, facsimile machine and other systems. Additionally, it will be understood by those of skill in the art, that the systems described herein may be practiced with any suitable interface devices, including touch-sensitive screens and pads, mouse input devices, keyboards and keypads, joysticks, thumb wheel devices, a mouse, a trackball, virtual reality input systems, voice control systems, eye movement control systems, and any other suitable devices. Thus, it will also be understood that the systems described herein have many uses and provide advantages over the prior art including providing a set of interface processes and systems that provide sophisticated manipulation of different document types.

Accordingly, it will be understood that the invention is not to be limited to the embodiments disclosed herein, but is to be understood from the following claims, which are to be interpreted as broadly as allowed under the law.

I claim:

1. A method for providing a user-interface, comprising:
   i. receiving by a document processing system a plurality of content documents associated with respective application programs in file formats associated with the respective application programs;
   ii. deriving by the document processing system, internal representations of the plurality of content documents, wherein the internal representations a) are in a common format other than the file formats associated with the respective application programs and b) describe the respective documents as collections of objects and parameters defining properties of the objects within each document;
   iii. providing a tool document file, representative of a graphical tool that performs a user interface function in relation to content documents received from a plurality of application programs, wherein the document tool file stores information about the graphical tool in the internal representation used to describe the plurality of content documents;
   iv. providing tool code associated with the tool document file;
   v. generating a screen document for display that is an aggregation of the internal representation of at least one of the plurality of content documents and internal representation of the graphical tool; and
   vi. rendering by the document processing system the screen document to create a single output display that integrates the at least one content document with the graphical tool that performs the user interface function.

2. A method according to claim 1, wherein the tool code comprises a script.

3. A method according to any one of claims 1 and 2, wherein the graphical tool is selected from the group of a user interface control tool and window/desktop furniture.

4. A method according to any one of claims 1 and 2, wherein the graphical tool is selected from the group consisting of a button, an icon, a pull down menu, a switch, and a slider control.

5. A method according to any one of claims 1 and 2, wherein the graphical tool is selected from the group consisting of a magnifying glass, a ruler, a text entry cursor, a thumbnail navigation control, and a query tool.

6. A method according to claim 1, wherein:
   i. the tool code associated with the tool document file, upon execution, processes the internal representation of the at least one content document to create a derived document which forms part of the screen document;
   ii. the derived document presents the content in a manner that achieves a display effect associated with the tool; and
   iii. the display effect is portrayed in a rendered screen document.

7. A method according to claim 6, wherein the derived document changes according to a contextual relationship among the graphical tool, the content document, and an application program in which the tool document file is used.

8. A method according to claim 7, wherein the contextual relationship is selected from the group consisting of a relative rendered position of the graphical tool and rendered portions of the content document, a time at which the graphical tool acts on rendered portions of the content document, and a state of rendered portions of the content document.

9. A method according to claim 1, further comprising:
i. providing a means to move the graphical tool to a selected position over a portion of the rendered content document, and
ii. processing the portion of the content document file associated with the selected position with the tool code.

10. A method according to claim 1, wherein the tool code comprises code for creating a display effect by altering at least one of the objects and parameters of the internal representation of at least one of the content documents.

11. A method according to claim 10, wherein altering at least one of the objects and parameters comprises modifying the internal representation of the at least one content document to add content to the screen document.

12. A method according to claim 1, wherein rendering the screen document comprises generating a view of the screen document expressed in terms of primitive figures and parameters.

13. A method according to claim 12 wherein the primitive figures are defined in terms of a bounding box, a shape, a transparency, and a data content of the figure.

14. A method according to claim 12, wherein the tool code, upon execution, processes the generated view of the screen document to create a display effect by altering the parameters of the primitive figures that make up the view of the screen document.

15. A method according to claim 14 wherein altering the parameters of the primitive figures comprises altering parameters selected from the group consisting essentially of a scale, a transparency, and a color of selected primitive figures within the screen document.

16. A method according to claim 14 wherein processing the generated view of the screen document comprises clipping selected primitive figures within the view of the screen document to a clipping area associated with the tool document file.

17. A method according to claim 1 wherein rendering the screen document comprises receiving a view control input that defines a viewing context and related temporal parameters to generate a context-specific view of the screen document.

18. A method according to claim 17 wherein the context-specific view is selected from the group consisting of all of the document objects within the screen document, a whole document object, parts of one or some of the document objects within the screen document.

19. The method according to claim 17 wherein the view control input is interpreted to determine which parts of the internal representation of the screen document are required for the context-specific view.

20. A method according to claim 17 wherein the view control input is interpreted to determine how, when and for how long the view is to be displayed.

21. A method according to claim 1 wherein:
i. the graphical tool is included in the screen document in response to the activation of a tool button by a user, and
ii. activation of the tool button by the user results in processing of the tool document file to include the graphical tool within the screen document.

22. A method according to claim 21, wherein:
i. the tool code associated with the tool document file, upon execution, processes at least one of the content documents or the tool document file to create a derived document which forms part of the screen document,
ii. the derived document presents at least a portion of the at least one content document in a manner that achieves a display effect associated with the tool, and
iii. the display effect is portrayed in the rendered screen document when the user activates the tool button.

23. A method according to claim 1 wherein the objects of the internal representations of the content documents and the tool document file are selected from the group consisting essentially of a text object, a bitmap graphic object, and a vector graphic object.

24. A method according to claim 23, wherein at least one of the objects are animated.

25. A method according to claim 23, wherein at least one of the object are not animated.

26. A method according to claim 23, wherein at least one of the object are two-dimensional.

27. A method according to claim 23, wherein at least one of the object are three-dimensional.

28. A method according to claim 1, wherein the objects are selected from the group consisting of a video object, an audio object, and an interactive object.

29. A method according to claim 1, wherein the objects are selected from the group consisting of a button, an icon, a pull down menu, a switch, and a slider control.

30. The method of claim 1, wherein deriving the internal representations of the plurality of content documents comprises selecting the objects used to describe the respective content documents from a common library of document objects.

* * * * *